(12) United States Patent
Ganey et al.

(10) Patent No.: US 9,389,750 B2
(45) Date of Patent: Jul. 12, 2016

(54) WIRELESS INTERFACE FOR ACCESS CONNECTIONS

(75) Inventors: Harriss C. Ganey, Cary, NC (US); David W. Hill, Cary, NC (US); Aaron M. Stewart, Raleigh, NC (US)

(73) Assignee: Lenovo (Singapore) Pte. Ltd., Singapore (SG)

(*) Notice: Subject to any disclaimer, the term of this patent is extended or adjusted under 35 U.S.C. 154(b) by 366 days.

(21) Appl. No.: 12/325,253

(22) Filed: Nov. 30, 2008

(65) Prior Publication Data

US 2010/0138794 A1 Jun. 3, 2010

(51) Int. Cl.
| | | |
|---|---|---|
| G06F 3/048 | (2013.01) | |
| G06F 3/0481 | (2013.01) | |
| H04W 4/08 | (2009.01) | |
| H04W 84/10 | (2009.01) | |
| H04W 88/02 | (2009.01) | |

(52) U.S. Cl.
CPC ............. *G06F 3/04817* (2013.01); *H04W 4/08* (2013.01); *H04W 84/10* (2013.01); *H04W 88/02* (2013.01)

(58) Field of Classification Search
CPC ........ H04W 4/08; H04W 84/10; H04W 88/02
USPC ......... 715/733, 734, 736, 853, 735, 737, 738, 715/739, 709; 709/224, 200
See application file for complete search history.

(56) References Cited

U.S. PATENT DOCUMENTS

| | | | | |
|---|---|---|---|---|
| 5,942,985 A * | 8/1999 | Chin | .................. | G07C 9/00309 340/10.33 |
| 6,225,999 B1 * | 5/2001 | Jain | ........................ | H04L 41/06 709/223 |
| 6,650,347 B1 * | 11/2003 | Nulu | ..................... | H04L 69/329 700/83 |
| 7,315,985 B1 * | 1/2008 | Gauvin | ................... | H04L 41/12 715/734 |
| 7,571,387 B1 * | 8/2009 | Yehuda | ............... | H04L 67/1097 709/223 |
| 7,587,675 B2 * | 9/2009 | Cunningham | .......... | H04L 41/22 370/254 |
| 2002/0052941 A1 * | 5/2002 | Patterson | .............. | G06F 9/5061 709/223 |
| 2007/0204231 A1 * | 8/2007 | Cunningham | .......... | H04L 41/22 715/734 |
| 2008/0062958 A1 * | 3/2008 | Jonsson | .................. | H04L 12/24 370/350 |
| 2008/0101258 A1 * | 5/2008 | Cheng | ..................... | H04L 12/66 370/254 |
| 2009/0019141 A1 * | 1/2009 | Bush | .................... | H04L 12/2807 709/223 |
| 2009/0029728 A1 * | 1/2009 | Shen | ..................... | H04W 48/14 455/507 |
| 2009/0052893 A1 * | 2/2009 | Beer | ................... | H04J 14/0227 398/42 |
| 2009/0296600 A1 * | 12/2009 | Canright | ................ | H04L 41/12 370/254 |
| 2009/0327903 A1 * | 12/2009 | Smith | ................ | H04L 12/2697 715/737 |

* cited by examiner

*Primary Examiner* — Anil Bhargava
(74) *Attorney, Agent, or Firm* — Ference & Associates LLC

(57) ABSTRACT

A process of pairing a wireless PAN (personal area network) device with a system can be facilitated first by assuming default PIN codes that are traditionally used with wireless PAN devices and then by attempting such presumed default codes before querying the user for input. Accordingly, a cumbersome task conventionally required of the user is most often removed. Also, the devices that are paired and connected are preferably graphically conveyed on a display or graphical user interface (GUI) in a manner that solidly implies that each PAN device is connected only to its system, and not (directly) to other PAN devices.

12 Claims, 3 Drawing Sheets

WIRELESS INTERFACE FOR ACCESS CONNECTIONS

FIELD OF THE INVENTION

The present invention relates generally to computer systems and other systems capable of integration into wireless networks, and to methods and arrangements for managing such systems and networks.

BACKGROUND OF THE INVENTION

Advances in technology often outpace the capability of consumers to understand how the technology works. Such is the case with the emerging technology of wireless personal area networks (WPAN's). Wireless PAN devices are traditionally connected so that only one user can connect to the device at any time. Many users, however, have trouble letting go of the notion that that all wireless devices can be connected to by multiple users concurrently, thereupon eliciting in such users great—and likely unneeded—concern about the security of their devices.

Additionally, another point of confusion and frustration for users arises in a two-step connection process typically required in such contexts, wherein the device is first paired with the system and then connected to the system.

Conventional products tend not to even attempt to help the user pair or connect a wireless PAN device to a system, and at best provide a cumbersome arrangement for doing so. Generally, conventional arrangements require a user to enter a PIN number as a security measure and, once the number is entered, the device will typically remain paired to the system unless purposefully paired to another system. However, such information is rarely if ever imparted to users, let alone in a clear and effective manner, with the regrettable end result that users still are often not able to understand various important aspects of the nature of a wireless connection with wireless PAN devices.

Accordingly, growing needs have been recognized at the very least in connection with helping users more readily acclimate to the peculiarities of PAN technology and thus imparting to them a more reliable, effective and practicable experience.

SUMMARY OF THE INVENTION

In accordance with at least one presently preferred embodiment of the present invention, a process of pairing a wireless PAN device with a system can be facilitated first by assuming default PIN codes that are traditionally used with wireless PAN devices and then by attempting such presumed default codes before querying the user for input. Accordingly, a cumbersome task conventionally required of the user is most often removed. Also, the devices that are paired and connected are preferably graphically conveyed on a display or graphical user interface (GUI) in a manner that solidly implies that each PAN device is connected only to its system, and not (directly) to other PAN devices.

In summary, one aspect of the invention provides an apparatus comprising: a visual user interface; the user interface comprising a first region and a second region; the first region acting to graphically convey a device connectable to a system; the second region acting to graphically convey a network comprising a system and devices connected with a system; the second region further acting to graphically convey that each device of the network is solely connected with a system depicted in the network.

Another aspect of the invention provides a method comprising: providing a visual user interface having a first region and a second region; g graphically conveying, at the first region, a device connectable to a system; graphically conveying, at the second region, a network comprising a system and devices connected with a system; and the graphical conveying at the second region further comprising graphically conveying that each device of the network is solely connected with a system depicted in the network.

Furthermore, an additional aspect of the invention provides a program storage device readable by machine, tangibly embodying a program of instructions executable by the machine to perform a method comprising: providing a visual user interface having a first region and a second region; g graphically conveying, at the first region, a device connectable to a system; graphically conveying, at the second region, a network comprising a system and devices connected with a system; and the graphical conveying at the second region further comprising graphically conveying that each device of the network is solely connected with a system depicted in the network.

For a better understanding of the present invention, together with other and further features and advantages thereof, reference is made to the following description, taken in conjunction with the accompanying drawings, and the scope of the invention will be pointed out in the appended claims.

DETAILED DESCRIPTION OF THE PREFERRED EMBODIMENTS

For a better understanding of the present invention, together with other and further features and advantages thereof, reference is made to the following description, taken in conjunction with the accompanying drawings, and the scope of the invention will be pointed out in the appended claims.

Figure 1:
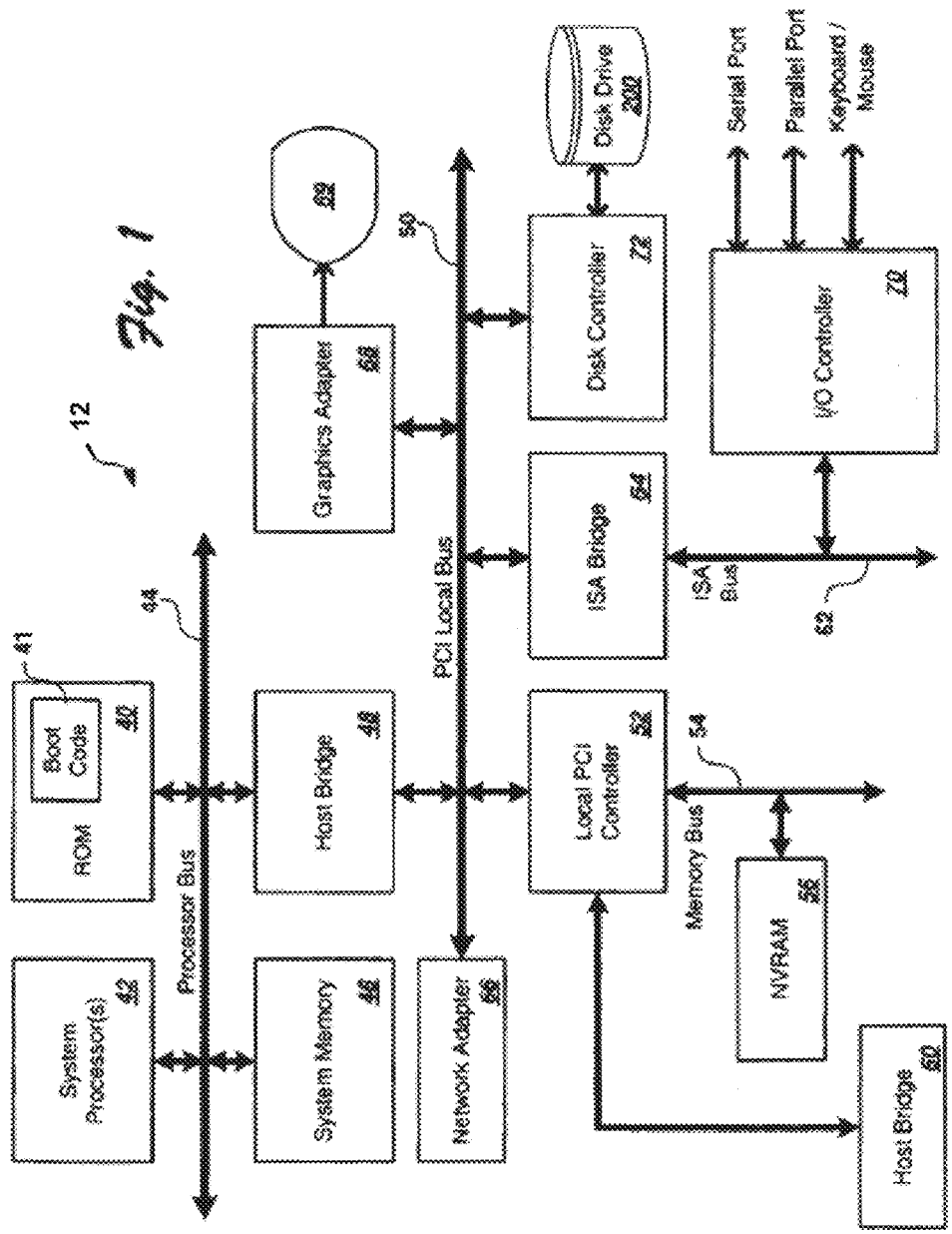
FIG. 1 schematically illustrates a computer system.
Figure 2:
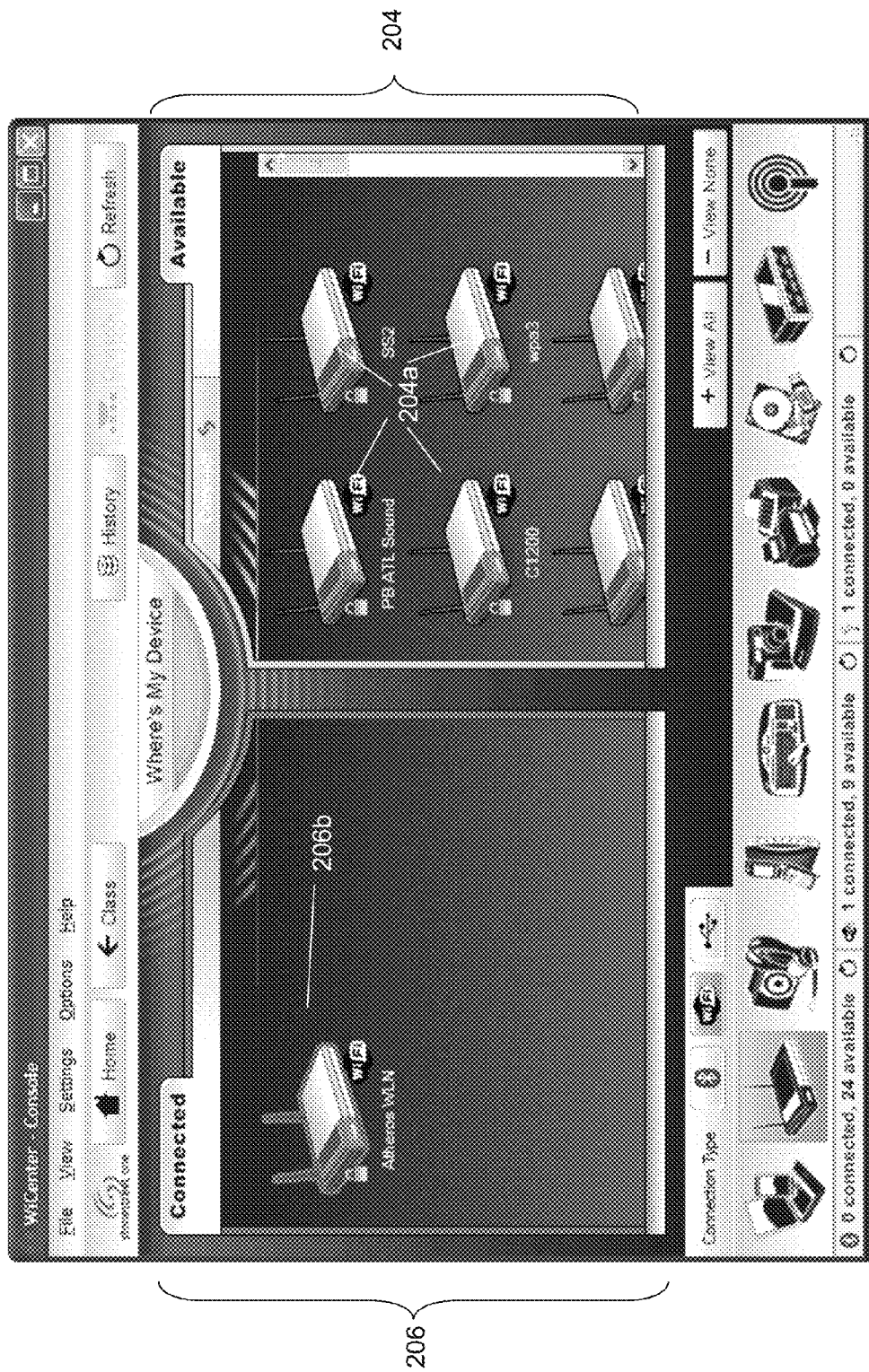
FIG. 2 shows a screen capture of a conventional user interface.
Figure 3:
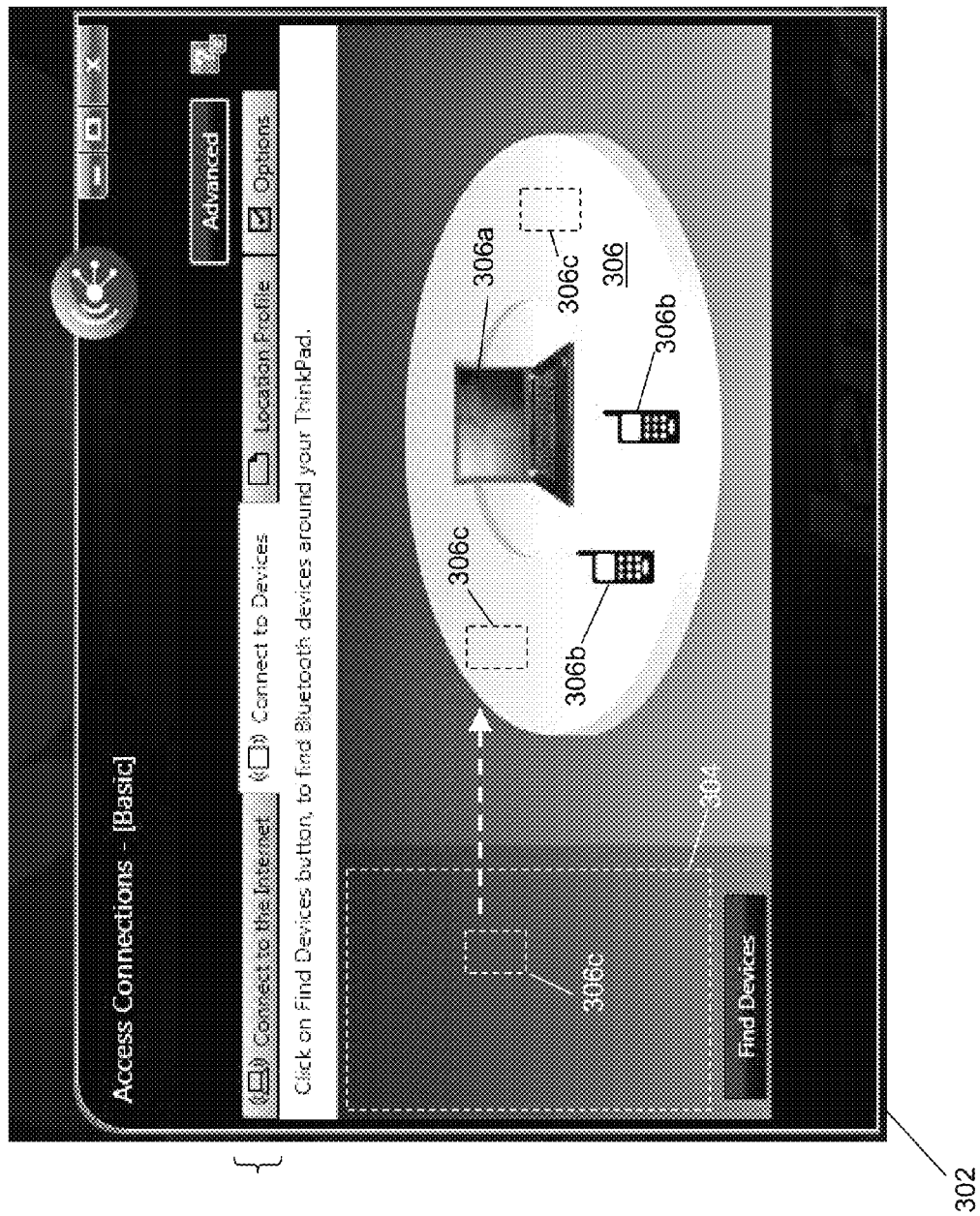
FIG. 3 shows a screen capture of a user interface according to an embodiment of the present invention.

It will be readily understood that the components of the present invention, as generally described and illustrated in the Figures herein, may be arranged and designed in a wide variety of different configurations. Thus, the following more detailed description of the embodiments of the apparatus, system, and method of the present invention, as represented in FIGS. 1 through 3, is not intended to limit the scope of the invention, as claimed, but is merely representative of selected embodiments of the invention.

Reference throughout this specification to "one embodiment" or "an embodiment" (or the like) means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

Furthermore, the described features, structures, or characteristics may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

The illustrated embodiments of the invention will be best understood by reference to the drawings, wherein like parts are designated by like numerals or other labels throughout. The following description is intended only by way of example, and simply illustrates certain selected embodiments of devices, systems, and processes that are consistent with the invention as claimed herein.

Generally, embodiments of the present invention are broadly contemplated in connection with use in a group arrangement, such as an arrangement comprising a server and clients. Such an arrangement, for instance, may be found within an IT organization. It will be appreciated from the discussion herethroughout that embodiments of the present invention present unique advantages in the context of a server-client setting, where security measures arranged at the server and client side alike result in efficient and much less cumbersome system access than in the case of conventional arrangements.

Referring now to FIG. 1, there is depicted a block diagram of an illustrative embodiment of a computer system 12. Such a computer system 12 can represent a "client" as understood herein in the context of a client-server setting. The illustrative embodiment depicted in FIG. 1 may be a notebook computer system, such as one of the ThinkPad® series of personal computers sold by Lenovo (US) Inc. of Morrisville, N.C., however, as will become apparent from the following description, the present invention is applicable to any data processing system. Notebook computers may alternatively be referred to as "notebooks", "laptops", "laptop computers" or "mobile computers" herein, and these terms should be understood as being essentially interchangeable with one another.

As shown in FIG. 1, computer system 12 includes at least one system processor 42, which is coupled to a Read-Only Memory (ROM) 40 and a system memory 46 by a processor bus 44. System processor 42, which may comprise one of the AMD™ line of processors produced by AMD Corporation or a processor produced by Intel Corporation, is a general-purpose processor that executes boot code 41 stored within ROM 40 at power-on and thereafter processes data under the control of operating system and application software stored in system memory 46. System processor 42 is coupled via processor bus 44 and host bridge 48 to Peripheral Component Interconnect (PCI) local bus 50.

PCI local bus 50 supports the attachment of a number of devices, including adapters and bridges. Among these devices is network adapter 66, which interfaces computer system 12 to a LAN, and graphics adapter 68, which interfaces computer system 12 to display 69. Communication on PCI local bus 50 is governed by local PCI controller 52, which is in turn coupled to non-volatile random access memory (NVRAM) 56 via memory bus 54. Local PCI controller 52 can be coupled to additional buses and devices via a second host bridge 60.

Computer system 12 further includes Industry Standard Architecture (ISA) bus 62, which is coupled to PCI local bus 50 by ISA bridge 64. Coupled to ISA bus 62 is an input/output (I/O) controller 70, which controls communication between computer system 12 and attached peripheral devices such as a keyboard and mouse. In addition, I/O controller 70 supports external communication by computer system 12 via serial and parallel ports. A disk controller 72 is in communication with a disk drive 200. Of course, it should be appreciated that the system 12 may be built with different chip sets and a different bus structure, as well as with any other suitable substitute components, while providing comparable or analogous functions to those discussed above.

As will be appreciated herebelow, display 69, or an analogous display arrangement of this or another computer system, may preferably be configured to display a graphical user interface or screen arrangement as broadly contemplated herein in accordance with at least one presently preferred embodiment of the present invention. The disclosure thus turns to a discussion of an arrangement according to an embodiment of the present invention, as shown in FIG. 3, as well as its comparison to a conventional arrangement, as shown in FIG. 2.

FIG. 2 shows a screen capture of a conventional user interface. It should be understood that while this can well appear on a computer screen display (such as the one indicated at 69 in FIG. 1), a similar or analogous interface can appear on essentially any suitable wireless device, such as a personal digital assistant (PDA) or a cell phone.

As shown, the GUI or other screen arrangement 202 includes an "available" field 204 and a "connected" field 206. The "available" field 204, shows icons 204a representing those devices that are able to be connected to the wireless network at hand, but are not currently so connected. The "connected" field 206, for its part, here shows an icons 206b representing a device that is connected in-network. As per conventional norms, there is no icon or other symbol representing the network itself, nor of a system serving as the network hub. This can thus impart a mistaken impression that all devices in question (204a/206b) are somehow connectable with one another, particularly in the absence of clear graphical evidence to the contrary.

By stark contrast, FIG. 3 shows a screen capture of a user interface according to an embodiment of the present invention. Again, it should be understood that while this can well appear on a computer screen display (such as the one indicated at 69 in FIG. 1), a similar or analogous interface can appear on essentially any suitable wireless device, such as a PDA or a cell phone.

As shown, a GUI or other screen arrangement 302 in accordance with a preferred embodiment of the present invention may include an "available" or "find device" field 304. Any wireless device capable of being connected (e.g., that is within range of a "Bluetooth" radio field centered on a "hub" system to be described below) but not yet connected is preferably represented within field 304 by a suitable icon 306c. On the other hand, a graphic representation of connection 306 may be embodied by an image the conveys or implies a central "hub" into which wireless devices connect. Here, this representation is in the form of a ring. As shown, a hub icon 306a may preferably be provided at the center of ring 306 (or other image); here the hub icon 306a is shown as a laptop icon. With a hub icon 306a represented centrally in the ring 306 or other image, device icons 306b can preferably be depicted on or at a periphery of the ring 306 or other image as shown. Here, device icons 306b are shown as cell phone icons. There are, of course, conceivable alternatives to the arrangement shown in FIG. 3. For instance, the general concept of an peripheral region about a hub could be embodied, e.g., by a system icon in a central region, with device icons in a region peripheral to the central region, where each single device icon is visually connected to the "hub" by a single line.

Generally, viable alternatives to a "ring" (as set forth herein) could conceivably include essentially any type of simple spacing and positioning around a central object. Embodiments of the invention can even incorporate relative spacing of device icons from the central (or hub) object based on different criteria such as, e.g., greater spacing as a function of strength of a corresponding wireless signal (e.g., a device depicted as "further" away from the central/hub region could indicate a weaker signal), and/or spacing from the central/hub region could be governed by categorical grouping into plural concentric "rings" or peripheral regions (e.g., an innermost ring or peripheral region about a central/hub region could include only input devices while a next outermost ring or peripheral region, within which the innermost ring or peripheral region and the central/hub region itself both nest, could include only wireless access points). As such, the relative spacing from a central/hub region could be discrete (or "stepped") or could be smoothly linear (e.g., spacing from a central/hub region is in direct proportion to a given parameter, such as wireless signal strength). If the relative spacing is in discrete/stepped fashion, then it is conceivable to graphically convey two or more nested rings similar to the ring 306 shown in FIG. 3. (It should be clearly understood that "spacing" as discussed hereabove need not necessarily be interpreted as exact dimensions as manifested on a computer screen, but instead could be interpreted as a relative perceptual distance as understood by a viewer, especially if, as in FIG. 1, a ring graphic or other illustrative medium is shown in a perspective view.)

Indicated at 306c on ring 306 are dotted boxes where other icons potentially could be placed. In accordance with a presently preferred embodiment of the present invention, a user may actually click on such an icon 306c from an original position in field 304 (the "available" or "find device" field) and then drag it to the peripheral area of the ring 306 (as schematically indicated by the dotted arrow). In so doing, to the extent that the user is in control of the "hub" system represented by icon 306a, the user may actually effect a connection between the "hub" system and the device represented by the icon 306c being dragged. This of course does not preclude the possibility that, when the "hub" system is powered up, connections will already have been established between the "hub" system and one or more peripheral devices, or that one or more such connections will automatically be established upon system power-up. Conceivably, this can be graphically be depicted in one of at least two ways: by showing a device icon 306c already present at ring 306 when the system is powered up, or by initially showing a device icon 306c in the "available" field 302 only to then quickly and automatically be carried over to the ring 306.

The act of effecting a connection between a wireless device and a "hub", as discussed above, can actually greatly facilitate what is normally a cumbersome two-step process, where typically a device is first paired with the system and then connected to the system. To this end, when a user undertakes a drag-and-drop of an icon as discussed above, the system may preferably automatically assume that the device is associated with a code (e.g., a PIN number [personal identification number]) that is traditionally used with such a device and thus attempt the connection first with that code. (For instance, many PINs or other codes are traditionally assigned at the factory as a starting point, and it is often the case that users don't bother to change or even wish to change these numbers to begin with.) Only if an incorrect or outdated code is assumed, may the system then preferably query the user to input a code (whereas conventionally the user always inputs such a code). Thus, there will be enjoyed here potential halving of the traditional two-step process; pairing (via merely associating a device with a "hub") and connecting (using a code to connect the two) can essentially be reduced to just the pairing step.

In a particularly preferred embodiment of the present invention, the "available" field 304 may preferably be configured to clearly convey or imply to a user a very wide range of information. Preferably, then, if icons 306c happen not to be shown in field 304 (and are not already shown as connected at ring 306), the user can understand that such devices not shown are either not in range or not available to be connected (i.e., are themselves powered off). Accordingly, the field 304 may also preferably be versatile and "smart" enough to convey devices that have been paired with and connected to in the past that are currently in range as well as other connectable devices that are currently newly "discovered" by the system.

As can be appreciated, "devices" as discussed hereinabove can be of a very wide variety, such as cell phones, PDA's, computer mice (e.g., those using "Bluetooth" technology) or, in the event of a cell phone being a "hub" system, a peripheral wireless item such as a "Bluetooth" headset. The icons representing any and all devices, as well as the "hub" system itself, may preferably be chosen as to clearly convey in graphical manner the nature of the device. "Devices" could also include wireless port replicators or other wireless access point devices.

"Hub" systems, for their part, and as broadly understood herein, though preferably could be embodied by desktop or laptop computer systems with wireless capability, may alternatively be embodied cell phones, wireless hot spots, or any of a very wide variety of other possibilities. Such other possibilities could include, but are by no means limited to, any of a very wide variety of devices that could be wireless-enabled, such as televisions, copiers, kiosks, servers and general (e.g., household) appliances.

The dragging and dropping of icons into a hub region (by way of facilitating and effecting user input) can be carried out by alternative arrangements, such as by typing a command into a popup window that will cause a device icon to move to or from a "ring" region. Other conceivable alternatives (for facilitating/effecting user input) could include mouse input, touch screen gestures or flicks and predetermined keyboard commands or short cuts.

Essentially, there need only be a limit on the number of devices connectable to a "hub" system as technology will allow. Preferably, the GUI 302 will permit the placement of as many device icons 306b on ring (or other image) 306 in full correspondence with the number of devices that can be connected to the "hub" system at one time. A practicable limit of the number of icons 306b on ring 306 can of course be established (e.g., 8 or 10 icons), with the understanding that some backup graphical representation will be available for any "extra" connected devices above that number (e.g., by shunting off "extra" device icons 306b to a side of the ring 306 or to another peripheral area of ring 306). In any event it is unlikely that more than 8 to 10 simultaneously "connected" device icons 306b will need to be represented as this tends to represent an upper realistic limit of many PANs; with each successive device added, the bandwidth available for the currently connected devices gets further divided. With the advent of UWB (ultra wide band) wireless networks a greater number of connected wireless devices is eminently possible given the greater available bandwidth, but industry trends actually appear to be pointing to having fewer connected devices in such contexts.

It is to be understood that the present invention, in accordance with at least one presently preferred embodiment, includes elements that may be implemented on at least one general-purpose computer running suitable software programs. These may also be implemented on at least one Integrated Circuit or part of at least one Integrated Circuit. Thus, it is to be understood that the invention may be implemented in hardware, software, or a combination of both.

If not otherwise stated herein, it is to be assumed that all patents, patent applications, patent publications and other publications (including web-based publications) mentioned and cited herein are hereby fully incorporated by reference herein as if set forth in their entirety herein.

Although illustrative embodiments of the present invention have been described herein with reference to the accompanying drawings, it is to be understood that the invention is not limited to those precise embodiments, and that various other changes and modifications may be affected therein by one skilled in the art without departing from the scope or spirit of the invention.

What is claimed is:

1. An apparatus comprising:
    one or more processors; and
    a display device operatively connected to said one or more processors, said display device having a visual user interface;
    said visual user interface comprising a first region and a second region displayed together on said display device;
    said first region acting to graphically convey a personal area network device within wireless range of a personal area network of said apparatus and connectable to said apparatus;
    said second region acting to graphically convey a ring graphic of a personal area network comprising said apparatus depicted towards a center of said ring graphic and personal area network devices connected directly with said apparatus via the personal area network depicted about the periphery of said ring graphic;
    said one or more processors initiating a connection between the personal area network device within said first region and said apparatus in response to user input moving an icon of the personal area network device from said first region to the periphery of said ring graphic of said second region;
    wherein said initiating comprises automatically using a default code for establishing a connection between the personal area network device and said apparatus.

2. The apparatus according to claim 1, wherein said devices in said second region are wireless personal area network devices.

3. The apparatus according to claim 1, wherein said first region acts to graphically convey devices previously employed within said personal area network.

4. The apparatus according to claim 1, further comprising an arrangement for graphically transferring to said second region, from said first region, an icon corresponding to a device.

5. The apparatus according to claim 4, wherein said arrangement for graphically transferring acts to initiate a connection between a device and said apparatus responsive to graphically transferring said icon from said first region to said second region.

6. The apparatus according to claim 5, wherein said arrangement for graphically transferring acts to automatically connect the device to said apparatus if the default code is correct.

7. The apparatus according to claim 1, wherein said arrangement for graphically transferring acts to query for a code entry if the default code is correct.

8. A method comprising:
    providing a visual user interface on a display device, said visual user interface having a first region and a second region displayed together on said display device;
    graphically conveying, at the first region, a personal area network device within wireless range of a personal area network of a hub system and connectable to said hub system;
    graphically conveying, at the second region, a ring graphic of the personal area network comprising said hub system depicted towards a center of said ring graphic and personal area network devices connected directly with said hub system via the personal area network depicted about the periphery of said ring graphic; and
    initiating a connection between the personal area network device within said first region and said hub system in response to user input moving an icon of the personal area network device from said first region to the periphery of said ring graphic of said second region;
    wherein said initiating comprises automatically using a default code for establishing a connection between the personal area network device and said hub system.

9. The method according to claim 8, wherein said graphical conveying at the first region comprises graphically conveying devices previously employed within said personal area network.

10. The method according to claim 8, further comprising graphically transferring to the second region, from the first region, an icon corresponding to a device.

11. The method according to claim 8, wherein said initiating comprises automatically connecting the device to the hub system if the default code is correct.

12. A hardware device readable by machine, embodying a program of instructions, the instructions being executable by the machine and comprising:
    instructions that provide a visual user interface on a display device, said visual user interface having a first region and a second region displayed together on said display device;
    instructions that graphically convey, at the first region, a personal area network device within wireless range of a personal area network of a hub system and connectable to said hub system;
    instructions that graphically convey, at the second region, a ring graphic of the personal area network comprising said hub system depicted towards a center of said ring graphic and personal area network devices connected directly with said hub system via the personal area network depicted about the periphery of said ring graphic; and
    instructions that initiate a connection between the personal area network device within said first region and said hub system in response to user input moving an icon of the personal area network device from said first region to the periphery of said ring graphic of said second region;
    wherein said instructions that initiate comprises instructions that automatically use a default code for establishing a connection between the personal area network device and said hub system.

* * * * *